United States Patent [19]

Lindner

[11] Patent Number: 4,511,897
[45] Date of Patent: Apr. 16, 1985

[54] SENSOR SYSTEM FOR METALLIC TARGETS INCLUDING DOPPLER RADAR AND RADIOMETER

[75] Inventor: Kurt Lindner, Ulm, Fed. Rep. of Germany

[73] Assignee: Licentia Patent-Verwaltungs GmbH, Fed. Rep. of Germany

[21] Appl. No.: 362,384

[22] Filed: Mar. 26, 1982

[30] Foreign Application Priority Data

Mar. 4, 1981 [DE] Fed. Rep. of Germany ....... 3113472

[51] Int. Cl.³ .............................................. G01S 13/86
[52] U.S. Cl. ..................................... 343/6 R; 343/351
[58] Field of Search ............................... 343/6 R, 351

[56] References Cited

U.S. PATENT DOCUMENTS 3,599,207 8/1971 Foiani ............................ 343/351 X Primary Examiner—Theodore M. Blum
Assistant Examiner—Gilberto Barrón, Jr.
Attorney, Agent, or Firm—McGlew & Tuttle

[57] ABSTRACT

In a sensor system including Doppler radar, a radiometer and circuits for comparing the target information received by the two devices, a receiving mixer comprising a mixer oscillator is employed both for transmitting the CW Doppler radar emission signal and for transforming the frequency of the returning radar echo and radiometer signal. At the output of the mixer, the Doppler signal is obtained as a low-frequency signal and the radiometer signal as an IF signal, so that both can easily be separated and individually processed. The radiometer signal is checked only for a jump in the noise temperature. With such a jump present and if simultaneously a radar target is detected, the presence of a metallic target is inferred.

5 Claims, 1 Drawing Figure

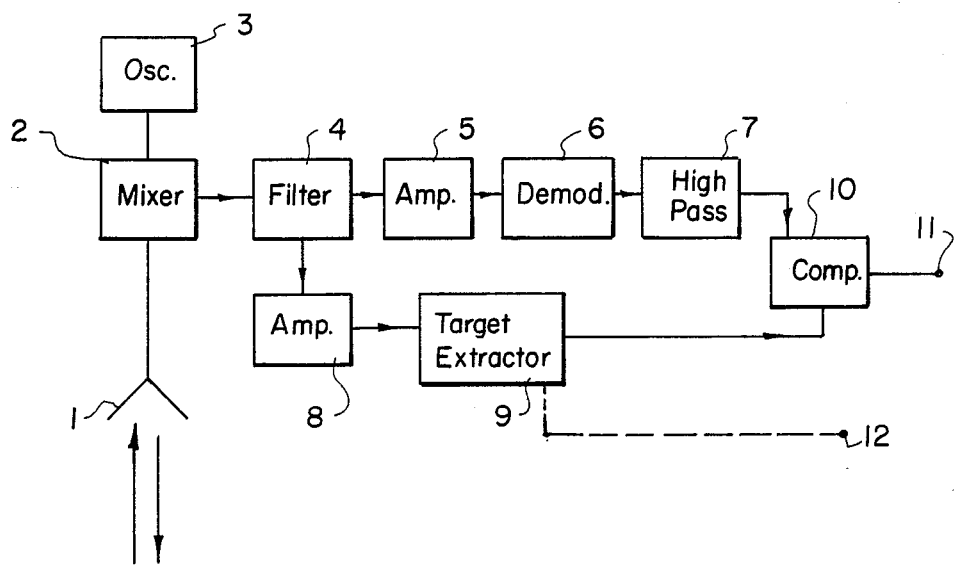

SENSOR SYSTEM FOR METALLIC TARGETS INCLUDING DOPPLER RADAR AND RADIOMETER

FIELD AND BACKGROUND OF THE INVENTION

The present invention relates to a sensor system comprising a radiometric device, a Doppler effect radar device, and means for comparing the signals received through these devices or the information obtained from such signals.

Such sensor systems are employed preferably for detecting metallic targets in a disturbed ambience, with the disturbance being mainly the irregularities of the earth's surface surrounding the target. The difficulty with radar sensors is that the disturbing returns from the ground and the return from the target to be detected may be of the same order of magnitude. This involves the risk of taking a disturbance for a target, or of failing to respond while taking a target for a disturbance.

In the detection of metallic targets by means of radiometric sondes, the experience is utilized that the noise temperature of the ground is generally about 300° K., while metallic objects reflect the temperature of the air or sky which is mostly below 100° K. A target may therefore, be identified by measuring the noise temperature of the target area acquired by the antenna of the radiometric system. Such an acquisition, however, is also responsive to water surfaces which reflect the sky temperature. This entails an inacceptably high chance of false alarms while detecting targets by means of a radiometric sonde.

Other prior art target detecting devices are active or passive optical sensors which, however, are generally impractical since they require favorable weather conditions.

Both radar sensors and radiometric sensors detect metallic targets. However, the false targets causing an erronious return are different in the two methods of detection, so that a combination of the two methods is capable of discriminating true targets from wrong ones by correlation. Such a combined sensor system requires radar equipment as well as a radiometric equipment. With the use of prior art devices, the total expenses therefore rise to a level which is too high in many applications where the space available for the sensor system is limited.

SUMMARY OF THE INVENTION

The present invention is directed to a sensor system with which metallic targets can definitely be detected in any ambience, even in complex clutters, and which at the same time is inexpensive.

Accordingly, an object of the invention is to provide a system for sensing a target comprising, an oscillator for generating a radar output signal, a mixer connected to the oscillator, an antenna connected to the mixer for transmitting the radar output signal and for receiving a radar input signal which is Doppler shifted from the radar output signal, and a radiometric signal which is proportional to the temperature of a target area, a filter connected to the mixer for dividing a signal from the mixer into a low frequency Doppler signal and the high frequency radiometric noise signal, a Doppler radar device connected to the filter for receiving the low frequency Doppler signal and a radiometric device connected to the filter for receiving the high frequency noise signal, and a comparator connected to the Doppler radar and radiometric devices for receiving a signal from each device, verifying the presence of a target in each device and producing a target signal upon such verification.

The inventive sensor system combines the advantages of radiometric measuring sondes with those of radar sensors and makes possible a definite identification of a target in a disturbed ambience, by correlating the information obtained through the two kinds of equipment. The inventive combination of the receiver sections of the radiometric and the Doppler radar considerably reduces the costs as compared to two separate systems, and provides thus a space saving and inexpensive sensor system. The small number of component parts produces a favorable effect on the reliability in operation and the weight of the system.

The signal received by the antenna is composed of a radar return signal, which is affected by the Doppler shift due to the relative displacement between the sensor system and the target and ground, and of a signal corresponding to the temperature radiation from the area covered by the antenna. The Doppler-effected radar return appears at the output of the mixer as a low frequency oscillation (CW Doppler radar). At the same time, the radiometric noise input is brought through the oscillator and the mixer into an intermediate frequency position.

After the mixer, the radar and radiometer signals can easily be separated in a filtering circuit, since their frequencies are far apart. The Doppler signal has generally a frequency below 10 kHz, while in the IF radiometric signal, the MHz range undergoes a wide-band amplification. After a separate processing of the two signals, and target-non-target decision in each of the two signal trains of the separate radiometer and Doppler radar devices, the two informations are brought in correlation and a definitive decision on the target situation is made.

In a particularly advantageous embodiment of the invention, the common receiver section of the Doppler radar and radiometer is so designed that the otherwise undesirable emission of the mixer oscillator of a microwave signal is intenionally not suppressed by compensation or screening, and is sent out in a controlled manner through the antenna as a transmitted Doppler radar signal. This eliminates the necessity of providing a separate transmission branch in the sensor system, which means that the costs and weight are further reduced. Within the limits of loading the mixer, the proportion of radiated energy may still be increased in a controlled manner, so as to further improve the performance of the Doppler radar.

A particularly rugged construction is obtained if a self-heterodyning mixing stage is substituted for the oscillator and the mixer. Only, such mixer stages are not yet available in the higher frequency millimeter wave range. With frequencies up to a number of GHz's, it is advantageous to design the system partly or completely according to a microstrip technique. With higher frequencies, however, this technique is not satisfactory, because of increasing losses through dissipation and material attenuation, as well as mechanical problems with the construction.

In these higher frequency ranges, the finline technique is advantageously applied in the construction, also for the antenna.

The low frequency Doppler signal is processed and evaluated in a recognition logic circuit by checking the amplitude and frequency variation of the Doppler oscillation in a manner known per se. Therefrom, the situation of the target is assessed.

While flying over normal ground, an approximately constant noise temperature of about 300° K. is measured by the radiometer.

Water surfaces and metallic targets reflect, to a large extent, the sky temperature which is generally below 100° K. Due to this difference in noise temperature, a radiometer can detect water surfaces and metallic targets. In a particularly advantageous design of the inventive transmitter system, the detection is directed not to the absolute noise temperature, but only to a temperature jump becoming manifest as a quick change in the radiometer signal. Therefore, the otherwise usual system drift compensation by means of reference checking through standard sources (such as a Dicke Switch) can be omitted. Advantageously, the radiometer signal, rectified through envelope detection, is directed through a high-pass filter.

This separates the DC voltage component of the radiometer signal which, as is well known is proportional to the radiation temperature of the body which the antenna is directed upon, and only the jump of the radiometer voltage is transmitted to the output of the high-pass filter as a pulse signal.

Due to the simultaneous processing of both signals, no switching time losses occur between the radar sensor and the radiometer. In addition, the radiometric reference switching is omitted, so that the target observation period is substantially extended.

The working area of the sensor system, i.e., the frequencies of the oscillator, are preferably the millimeter wave windows at 33 and 94 GHz, which are the intervals of minimum absorption of the atmosphere.

A preferred application of the inventive sensor system may by the detection of metallic targets on the ground from flying missiles, where the space saving and rugged construction and small weight are particularly useful.

Another object of the invention thus is to provide a sensor system which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

The only FIGURE is a block diagram of the inventive sensor system.

DESCRIPTION OF THE PREFERRED EMBODIMENT

In the following, one embodiment of the invention is described which is schematically illustrated by the accompanying drawing. The output of an oscillator 3 is applied to a mixer 2 and the power is partly delivered through this mixer 2 to an antenna 1, for being transmitted as a CW signal. As a return, the antenna receives and transmits to the mixer a microwave radiation comprising both the echoes of the emitted radiation and the thermal radiation of the target. Due to mixing with the oscillator frequency and to the sensor's proper motion, the return signal appears at the output of microwave mixer 2 as a low frequency Doppler signal, and the noise power of the target appears as an intermediate-frequency signal. In a channel filter 4, the Doppler signal in the range of up to 10 kHz and the IF radiometer signal in the MHz range are filtered out of the output signal of the mixer.

The mixer 2 includes transmitter means which, as noted above, transmits the undesirable disturbance signals and emissions of the mixer oscillator 3, of a microwave signal thereof, in a controlled manner through the antenna 1 as a transmitted Doppler radar signal.

The Doppler signal is amplified in an amplifier 8 and checked in a target extractor 9 for the presence of a target. Upon target detection, a corresponding signal is delivered to a comparator 10. In addition, range resolution may be obtained, in a first approximation, from the amplitude of the Doppler signal, since the cross section of the radar in the short-range field is known. This is done at terminal 12. Simultaneously, the radiometer signal is amplified in a wide band (5 to 500 MHz) in amplifier 5 and detected by means of a envelope demodulator 6. In a following high-pass filter 7, the drift-affected DC voltage component of the radiometer signal is separated and only the jump in the signal corresponding to that in the noise temperature is transmitted as a pulse signal. This pulse is applied to comparator 10 where a target is detected only if, at the same time, a target is also detected by the target extractor of the Doppler radar device. A target detection signal is then provided at terminal 11.

While a specific embodiment of the invention has been shown and described in detail to illustrate the application of the principles of the invention, it will be understood that the invention may be embodied otherwise without departing from such principles.

What is claimed is:

1. A sensor system including a radiometric device, a Doppler radar device, and means for comparing signals obtained through said devices, characterized by a receiving circuit which is common to both said radiometric device and said Doppler radar device and which comprises an antenna, a mixer connected to said antenna, and a mixer oscillator connected to said mixer, and by a channel filter arrangement connected to said mixer, in which low frequency Doppler signals and high frequency radiometer signals contained in an output signal of said mixer are separately filtered out and supplied for signal processing and evaluation to separate devices comprising said radiometric device and said Doppler radar device, and wherein means for detecting quick changes in the radiometric signal are provided in said radiometric device.

2. A sensor system according to claim 1, characterized in that said means comprise an envelope demodulator and a high-pass filter connected to said demodulator.

3. A sensor system according to claim 2, characterized in that working areas of the system are the atmospheric millimeter wave windows at 33 and 94 GHz.

4. A sensor system according to claim 2, characterized in that said receiving circuit common to said Doppler radar device and said radiometric device comprises transmitter means for said Doppler radar device, for transmitting a disturbance signal of said mixer oscillator through said antenna as transmitting power for said radar device.

5. A system for sensing a target, in particular a target in a disturbed ambience, comprising:
- an oscillator for generating a radar output signal;
- a mixer connected to said oscillator for receiving said radar output signal;
- an antenna connected to said mixer for transmitting said radar output signal and for receiving a radar input signal which is Doppler shifted by a low-frequency Doppler signal from said radar output signal, and a radiometric signal which is proportional to the temperature of a target area scanned by said antenna;
- a filter connected to said mixer for dividing a signal from said mixer into the low-frequency Doppler signal and into the radiometric signal which is a high-frequency infrared signal;
- a Doppler radar device connected to said filter for receiving said low-frequency Doppler signal;
- a radiometric device connected to said filter for receiving said high frequency noise signal;
- a comparator connected to an output of said Doppler radar device and said radiometric device for verifying the presence of a target by each of said Doppler radar and radiometric devices, and generating a target verification signal;
- said Doppler radar device comprising an amplifier connected to said filter and a target extractor connected between said amplifier and said comparator;
- said radiometric device comprising a second amplifier connected to said filter, an envelope demodulator connected to said second amplifier and a high-pass filter connected to said envelope demodulator for removing a drift effected DC voltage component from said radiometric signal so that only a jump in said radiometric signal corresponding to the presence of a target is provided to said comparator.

* * * * *